US009518678B2

(12) United States Patent
Bürgi et al.

(10) Patent No.: US 9,518,678 B2
(45) Date of Patent: Dec. 13, 2016

(54) ELECTRICAL FEEDBACK DEVICE FOR VALVES

(71) Applicant: Georg Fischer Rohrleitungssysteme AG, Schaffhausen (CH)

(72) Inventors: Stefan Bürgi, Basadingen (CH); Jürgen Stumpp, Klettgau (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 279 days.

(21) Appl. No.: 14/516,735

(22) Filed: Oct. 17, 2014

(65) Prior Publication Data

US 2015/0034186 A1   Feb. 5, 2015

Related U.S. Application Data

(62) Division of application No. 13/377,993, filed as application No. PCT/EP2010/057955 on Jun. 8, 2010, now Pat. No. 9,062,789.

(30) Foreign Application Priority Data

Jun. 16, 2009 (EP) .................................... 09162814

(51) Int. Cl.
    *F16K 31/60*     (2006.01)
    *F16K 37/00*     (2006.01)
    *F16K 35/02*     (2006.01)

(52) U.S. Cl.
    CPC ........... *F16K 37/0041* (2013.01); *F16K 31/60* (2013.01); *F16K 31/605* (2013.01); *F16K 35/02* (2013.01); *F16K 35/025* (2013.01); Y10T 137/8242 (2015.04)

(58) Field of Classification Search
    CPC ...... F16K 37/0041; F16K 35/02; F16K 31/60; F16K 35/025; F16K 31/605; Y10T 137/8242
    USPC ............... 137/554; 251/248, 249.5, 251, 264
    See application file for complete search history.

(56) References Cited

U.S. PATENT DOCUMENTS

| | | | | |
|---|---|---|---|---|
| 792,258 | A * | 6/1905 | Grinnell | H01H 3/0206 169/23 |
| 862,551 | A * | 8/1907 | Gardner | H01H 3/0206 137/554 |
| 1,754,310 | A | 4/1930 | Ellenberger | |
| 1,790,009 | A * | 1/1931 | Karnath | F16K 31/05 137/554 |
| 1,878,569 | A | 9/1932 | Zolleis | |

(Continued)

FOREIGN PATENT DOCUMENTS

| | | |
|---|---|---|
| DE | 19926867 A1 | 12/2000 |
| EP | 1469242 A1 | 10/2004 |

*Primary Examiner* — John Bastianelli
(74) *Attorney, Agent, or Firm* — Bachman & LaPointe, P.C.

(57) ABSTRACT

An electrical feedback device (6) of a valve (1) is provided for feeding back the position of a hand wheel (4) of the valve (1) and thus the position of a shut-off member of the valve (1). The electrical feedback device (6) can be mounted in a spindle housing (13) of a housing upper part (2) of the valve (1). The electrical feedback device is configured so that the rotational movement of the hand wheel (4) is converted into a linear movement of a trip cam (45). The electrical feedback device (6) has a gearwheel (43) which is driven by a screw thread (42) which is mounted on a ring (41).

13 Claims, 5 Drawing Sheets

(56) References Cited

U.S. PATENT DOCUMENTS

| | | | | |
|---|---|---|---|---|
| 1,952,397 A | * | 3/1934 | Turner | F16K 37/0041 137/554 |
| 2,989,988 A | * | 6/1961 | Rudelick | C02F 1/42 137/624.19 |
| 3,026,742 A | | 3/1962 | Bruno | |
| 3,311,121 A | | 3/1967 | Morrell | |
| 3,671,692 A | * | 6/1972 | Potter | F16K 37/0041 137/554 |
| 4,519,581 A | | 5/1985 | Paul | |
| 4,589,629 A | | 5/1986 | Gaffney et al. | |
| 4,815,693 A | | 3/1989 | James et al. | |
| 4,842,009 A | | 6/1989 | Reback | |
| 5,025,826 A | | 6/1991 | Schoepe et al. | |
| 5,223,822 A | * | 6/1993 | Stommes | F16K 37/0008 137/551 |
| 5,803,681 A | | 9/1998 | Landwerlen | |
| 5,887,850 A | | 3/1999 | Ruffalo | |
| 6,079,441 A | * | 6/2000 | Miller | F16K 37/0041 137/554 |
| 6,267,139 B1 | | 7/2001 | Miklo et al. | |
| 6,347,784 B1 | | 2/2002 | Philipps-Liebich et al. | |
| 7,011,291 B2 | | 3/2006 | Miklo et al. | |
| 2001/0035510 A1 | * | 11/2001 | Oh | F16K 31/535 251/129.03 |
| 2004/0011408 A1 | * | 1/2004 | Campbell | F16K 37/0041 137/554 |
| 2009/0121170 A1 | | 5/2009 | Ito et al. | |

\* cited by examiner

ELECTRICAL FEEDBACK DEVICE FOR VALVES

CROSS-REFERENCE TO RELATED APPLICATION

This is a divisional application of U.S. patent application Ser. No. 13/377,993, filed Dec. 13, 2011, and entitled "Actuating Device for Actuating Valves", the disclosure of which is incorporated by reference herein in its entirety as if set forth at length.

BACKGROUND OF THE INVENTION

The present invention relates to an actuating device for actuating valves having a spindle, wherein the actuating device is formed as a hand wheel having a locking element and a preferably electric feedback device.

In pipeline construction, valves are used to regulate flow rates of various media. Valves which are formed with hand wheels as actuating devices must be protected against unauthorized actuation by means of locking elements.

On the basis of this prior art, it is an object of the invention to specify an actuating device which operates as reliably as possible and can be produced as simply as possible.

SUMMARY OF THE INVENTION

The object is achieved by an actuating device for actuating valves having a spindle, wherein the actuating device is formed as a hand wheel having a locking element and an electric feedback device, characterized in that the locking element is formed in one piece and is arranged integrally in the hand wheel.

It is advantageous if the valve cannot be actuated by unauthorized persons. This is achieved by a one-piece locking element being arranged integrally in the hand wheel in a manner interacting with the spindle. The locking element is formed to fix the axial and radial positions of the hand wheel with respect to the spindle. The locking element has at least one resilient finger, formed perpendicularly to the spindle axis, to fix the axial position of the hand wheel with respect to the spindle, and has a slide, formed parallel to the spindle axis, to fix the radial position of the hand wheel with respect to the spindle.

BRIEF DESCRIPTION OF THE DRAWINGS

An exemplary embodiment is described with reference to the figures, in which.

DETAILED DESCRIPTION

Figure 1:
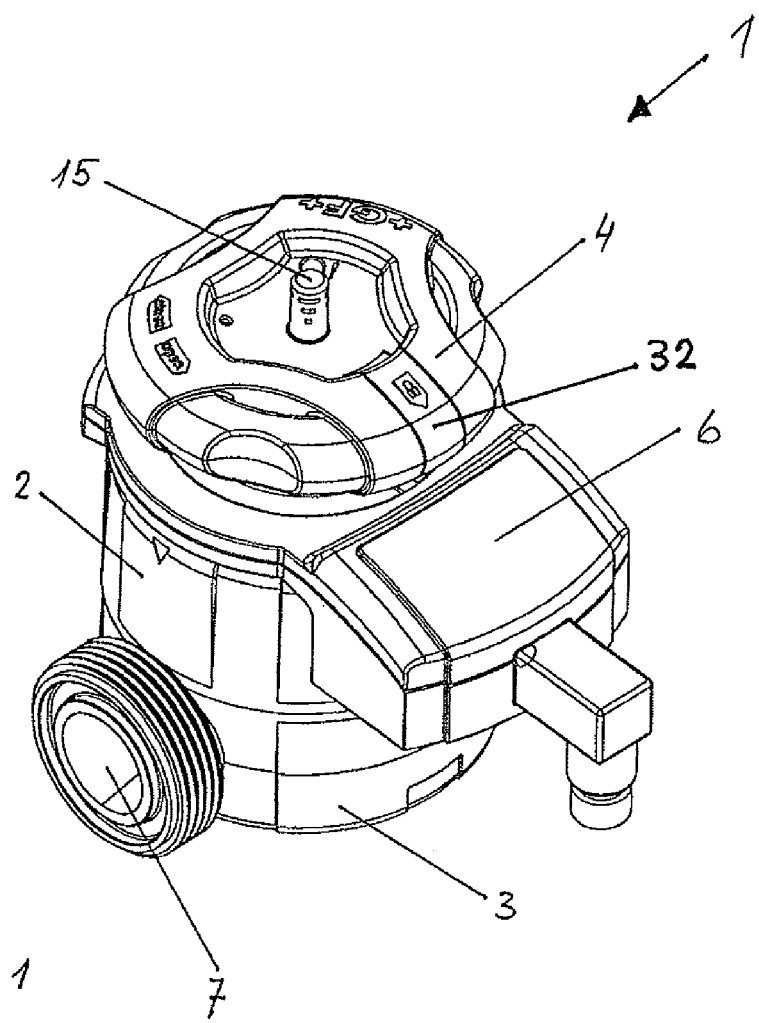
FIG. 1 shows a perspective view of a valve having the actuating device according to the invention.

FIG. 1 illustrates a valve 1, for example a diaphragm valve, in perspective. The valve 1 consists of an upper housing part 2, a mating lower housing part 3, an actuating member, illustrated here as a hand wheel 4 having a locking element 32, an extension 15 of a spindle 5 and an electric feedback device 6. The lower housing part 3 has three openings, of which only one pipe coupling 7 can be seen in FIG. 1 and another 8 in FIG. 8.

Figure 2:
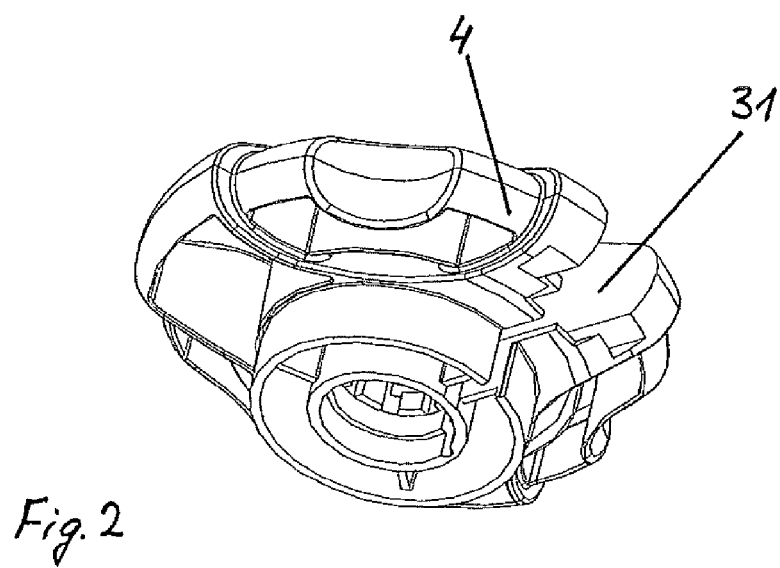
FIG. 2 shows a perspective view of the actuating device formed as a hand wheel.

FIG. 2 illustrates the hand wheel 4 in perspective. The hand wheel 4 has a radially formed cutout (recess) 31, in which the locking element 32 can be accommodated in a radially displaceable manner.

Figure 3:
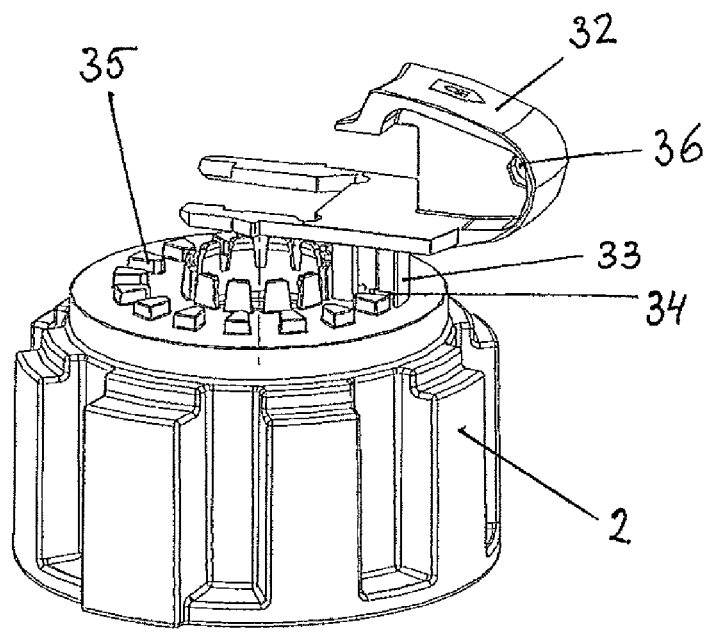
FIG. 3 shows a perspective view of the locking element and of the upper housing part of the valve in a first end position of the locking element.
Figure 4:
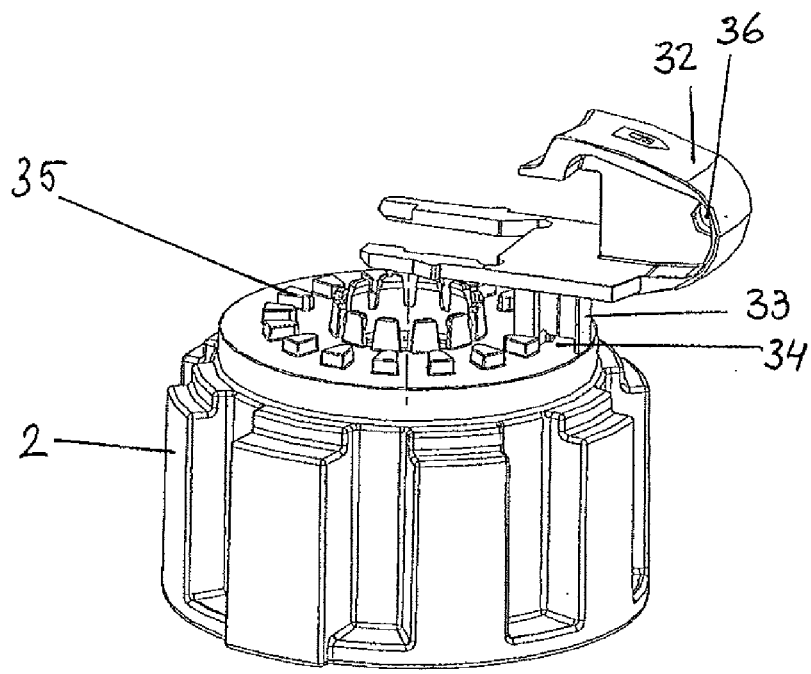
FIG. 4 shows a perspective view of the locking element and of the upper housing part of the valve in a second end position of the locking element.
Figure 5:
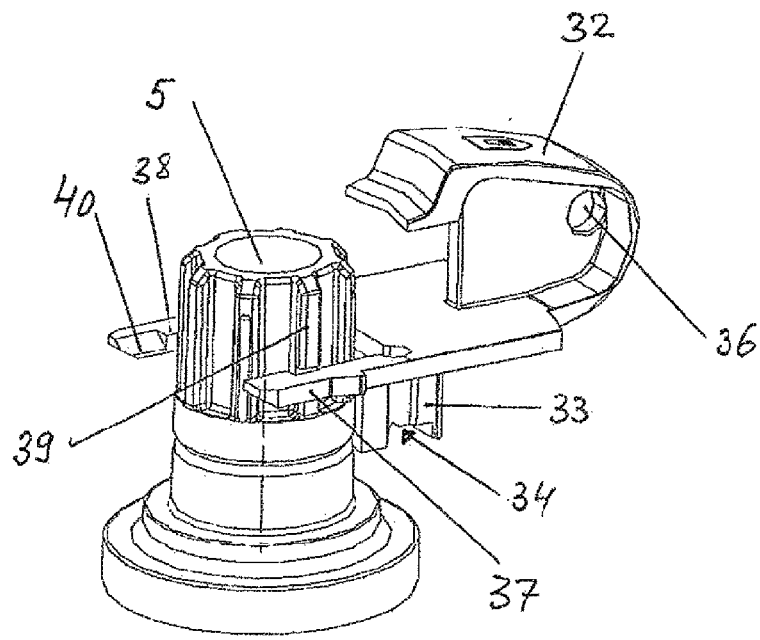
FIG. 5 shows a perspective view of the locking element and of the spindle of the valve in the first end position.
Figure 6:
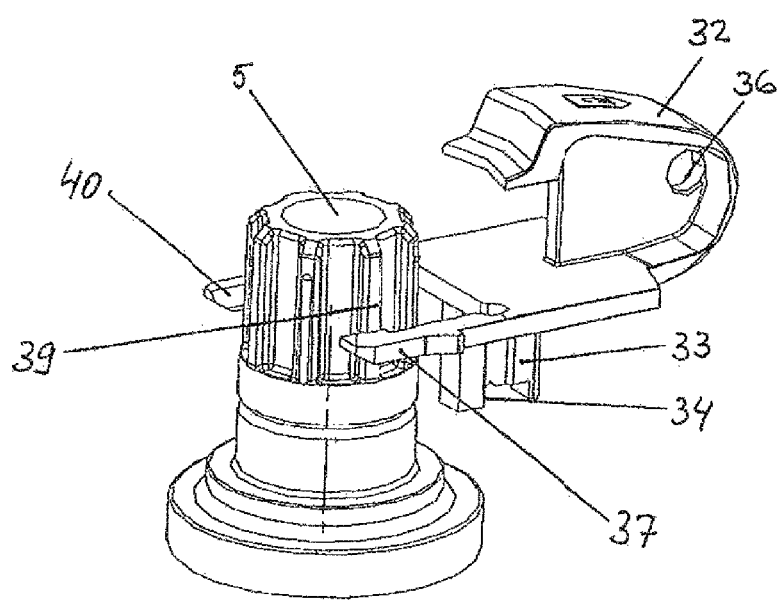
FIG. 6 shows a perspective view of the locking element and of the spindle of the valve in the second end position.

The locking element 32 is illustrated interacting with the upper housing part 2 in FIGS. 3 and 4 and interacting with the spindle 5 in FIGS. 5 and 6. The locking element 32 has a slide 33, which extends as a perpendicularly arranged and radially displaceable plate from the locking element 32 to the upper side of the upper housing part 2.

FIG. 3 illustrates the slide 33 in the radially inserted state with respect to the spindle axis, i.e. in the normal operating state of the valve 1. The slide 33 has a through-opening 34, through which the cams 35, which are formed on the upper side of the upper housing part 2, pass during the rotational movement of the hand wheel 4. In the position shown in FIG. 3, the valve 1 can be actuated with the hand wheel 4.

FIG. 4 illustrates the slide 33 in the radially withdrawn state. In this position, the radial position of the hand wheel 4 is fixed. The hand wheel 4 cannot be actuated and the spindle 5 cannot be rotated in this position. In order to secure the valve in the locked position, the locking element 32 has a bore 36, into which a padlock (not illustrated here) or any other suitable security device can be introduced. This prevents unauthorized actuation of the valve 1.

As illustrated in FIGS. 5 and 6, the locking element 32 further has two resilient fingers 37, 38, which are formed in a manner interacting with the spindle 5. The resilient fingers 37, 38 engage with further cams 39, which are formed on the periphery of the spindle 5. The resilient fingers 37, 38 prevent unauthorized removal of the hand wheel 4 from the spindle 5. The axial position of the hand wheel 4 with respect to the spindle 5 is fixed. It is only possible to pull off the hand wheel 4 when the locking element 32 is in the normal operating state, as illustrated in FIG. 5. It is only by means of a special tool that the resilient fingers 37, 38 can be moved away from the spindle 5 towards the outside, so that the hand wheel 4 can be pulled off the spindle 5. For this purpose, the resilient fingers 37, 38 have oblique surfaces 40, which can be pressed outwards by the special tool. It can be seen in FIG. 6 how the end of the resilient finger 37 engages in a recess in the cam 39 of the spindle 5, thereby preventing the hand wheel 4 from being pulled off in this operating position. With the hand wheel 4 described here, having the locking element 32, the hand wheel 4 can be completely secured both in the radial direction and in the axial direction using a single component.

Figure 7:
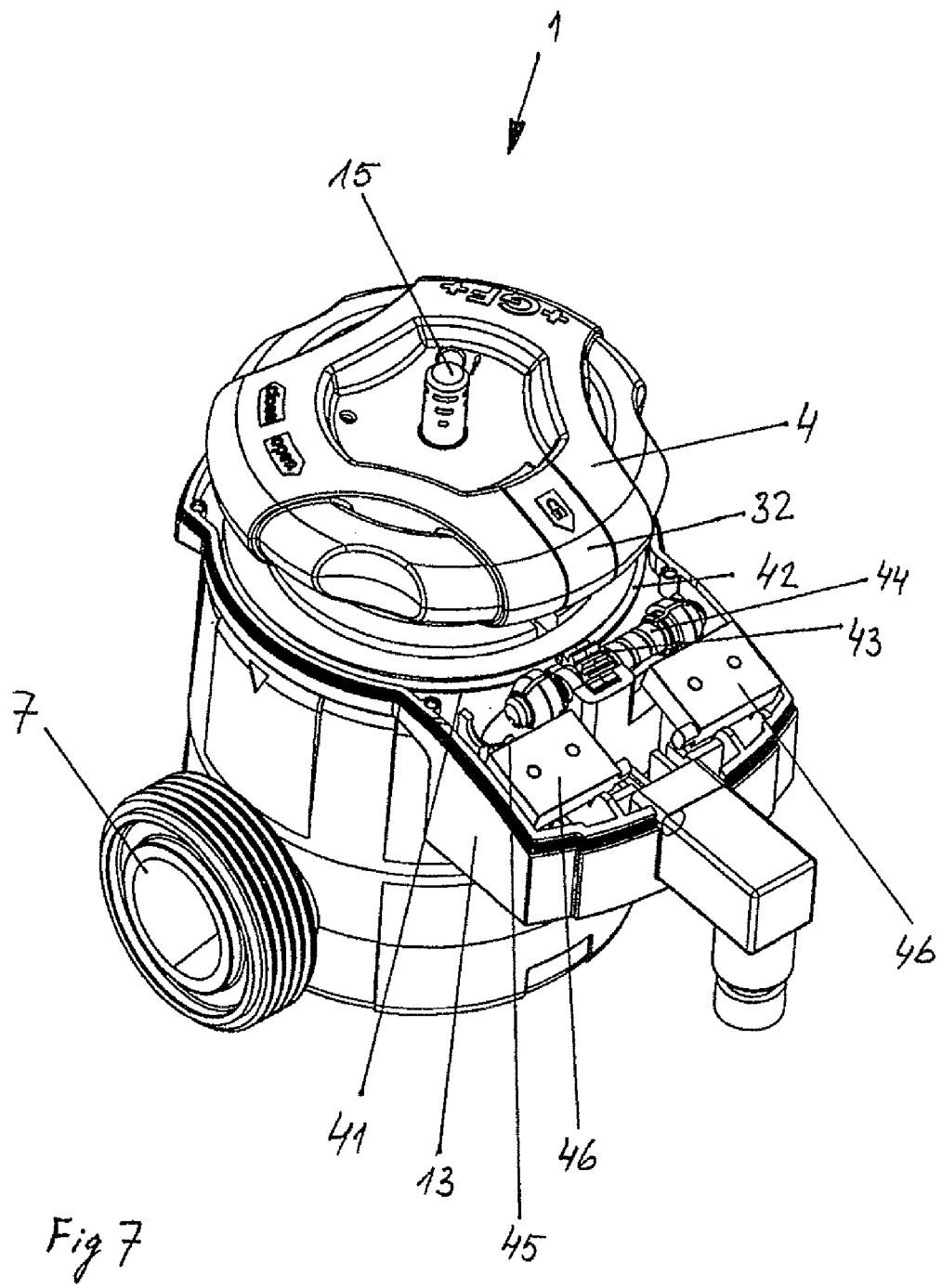
FIG. 7 shows a perspective view of an electric feedback device and FIG. 8 shows a view of the electric feedback device of FIG. 7.
Figure 8:
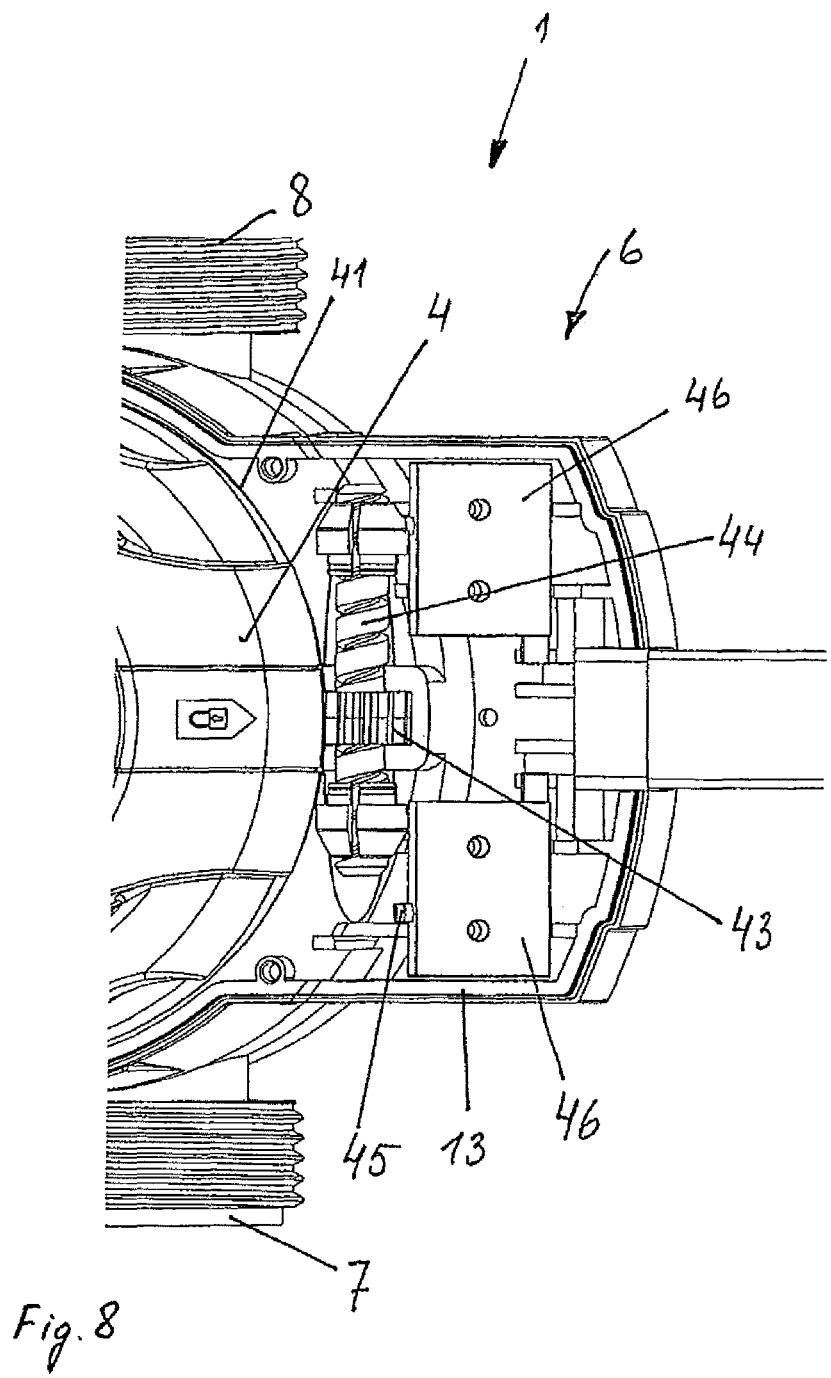

FIGS. 7 and 8 illustrate the electric feedback device 6 for providing feedback on the position of the hand wheel 4 and thus the position of the shut-off element of the valve 1. The electric feedback device 6 is arranged in the spindle housing 13 of the upper housing part 2 of the valve 1. Arranged in the upper housing part 2 is a ring 41, which is connected to the spindle 5 and has a screw thread 42 formed on the annular rim. The screw thread 42 interacts via a gear wheel 43 with a worm gear mechanism 44. The worm gear mechanism 44 drives two switching cams 45, which execute a linear movement. As a result of this, the rotational movement of the hand wheel 4 is converted into a linear movement of the switching cams 45. The switching cams 45 interact with microswitches 46, which are able to send electric pulses to a position indicator (not illustrated here).

What is claimed is:

1. Electrical feedback device (6) of a valve (1) for feeding back the position of a hand wheel (4) of the valve (1) and thus the position of a shut-off member of the valve (1), characterised in that:
    the electrical feedback device (6) can be mounted in a spindle housing (13) of a housing upper part (2) of the valve (1)
    the electrical feedback device is configured so that the rotational movement of the hand wheel (4) is converted into a linear movement of a trip cam (45); and
    the electrical feedback device (6) has a gearwheel (43) which is driven by a screw thread (42) which is mounted on a ring (41).

2. Electrical feedback device according to claim 1, characterised in that the electrical feedback device (6) has at least one micro switch (46).

3. Electrical feedback device (6) according to claim 2, characterised in that the electrical feedback device is configured so that the micro switch (46) is actuated by said cam.

4. Electrical feedback device (6) according to claim 1, characterised in that the electrical feedback device (6) is configured to be self-adjusting and can be fitted on at a later stage.

5. Electrical feedback device according to claim 1, characterised in that the electrical feedback device is configured so that the electrical feedback device (6) has at least one micro switch (46).

6. Electrical feedback device (6) according to claim 1, characterised in that the micro switch (46) is actuated by trip cams (45) arranged for linear movement.

7. Electrical feedback device (6) according to claim 1, characterised in that the electrical feedback device (6) is configured to be self-adjusting and can be fitted on at a later stage.

8. A combination comprising:
    a valve (1) according to claim 1; and said electrical feedback device (6) wherein the electrical feedback device is mounted in said spindle housing.

9. The combination of claim 8 wherein the electrical feedback device (6) is configured to be self adjusting and can be fitted on at a later stage.

10. The combination of claim 9 wherein the electrical feedback device (6) has at least one micro switch (46).

11. The combination of claim 10 wherein the electrical feedback device is configured so that the micro switch (46) is actuated by said trip cam.

12. The combination of claim 8 wherein the electrical feedback device is configured so that the electrical feedback device (6) has at least one micro switch (46).

13. The combination of claim 12 wherein the micro switch (46) is actuated by said trip cam.

* * * * *